UNITED STATES PATENT OFFICE.

FLORENT SABLON, OF FACHES-THUMESNIL, FRANCE, ASSIGNOR TO SOCIÉTÉ ANONYME ELECTRIQUE DE CHUMESNIL, OF CHUMESNIL-LEZ-LILLE, FRANCE.

ELECTRIC BATTERY AND ACCUMULATOR.

1,088,374.  Specification of Letters Patent.  Patented Feb. 24, 1914.

No Drawing.  Application filed August 15, 1913.  Serial No. 784,869.

*To all whom it may concern:*

Be it known that I, FLORENT SABLON, of 3 Place Victor Hugo, Faches-Thumesnil, Nord, in the Republic of France, have invented Improvements in Electric Batteries and Accumulators, of which the following is a full, clear, and exact description.

For the purpose of preventing the plates and the electrolyte from moving about in electric batteries and especially in electric storage batteries or accumulators, use has been made of porous materials of all kinds, for instance asbestos in the fibrous state or in the powdered state, carbon, porcelain, kieselguhr, and generally all porous materials which are inert to the acid constituting the exciting liquid. Storage batteries constructed in this manner are attended by the following drawbacks: The pores of the materials used for preventing movement are so large as to allow of the entrance therein of the metallic oxids which in storage batteries travel from one pole to the other during the charging and discharging of the battery. The result is that these materials become very soon conductors of the electric current, so that the storage battery loses its charge and ceases to be of any practical use. Further when these materials are employed in the powdered state they become agglomerated and form together with the oxids very soon a compact mass, which prevents the batteries and accumulators from working under good conditions. In time, these agglomerated materials form a compact hard block, which often causes the breakage of the battery vessels, owing to the want of elasticity of the said block, which hinders the free expansion or swelling of the plates.

The present invention has now for its object to provide improved electrical batteries and storage batteries or accumulators which will not be attended by the aforesaid drawbacks.

The invention consists substantially for the purpose of preventing movement in primary and secondary batteries of a special material in a particular state of subdivision. The texture of this special material is such that the pores are so minute that the oxids and metallic particles carried along by the charging and discharging operations are unable to penetrate therein. Owing to its particular state of subdivision, the said material is unable to become agglomerated, while it insures a complete "immobilization" of the electrolyte and the plates and consequently a permanent and good operation and a long life of the batteries, notwithstanding the shocks or vibrations to which they may be exposed. This improved material consists of an asbestos porcelain having such small pores that the oxids and metallic particles are unable to enter therein. This ceramic material of asbestos is composed preferably of a double silicate of magnesia and lime, such as asbestos (in the proportion of about 70 per cent.) and of a tri-silicate of magnesia, such as steatite (in the proportion of about 30 per cent.)

The very hard material obtained by baking the above mixture is crushed (by means of any suitable crusher or breaker) into small fragments of medium size of about a millimeter. In sifting the crushed product, care must be taken to eliminate the powder and dust as well as any lumps which are too large for the purpose in view. In fact if the powder of the product were used, the same drawbacks might be experienced as with the powder of other materials. On the other hand if lumps of too large size are used, then the resulting contact and packing would not be sufficient to hold the oxids and to prevent them from becoming detached and falling to the bottom of the battery vessels. The small fragments produced as hereinbefore described, that is to say the non-granulated particles, have rough surfaces which enable all these fragments or particles to engage with one another in such a manner that the packing thus produced will have a great homogeneity and will insure at all points a sufficient contact for holding the oxids. Moreover these very hard fragments which are engaged and so to speak, hooked into one another, will yet as a whole allow of a certain amount of play, thus imparting to the mass a relative amount of elasticity which will permit of free expansion or swelling of the plates without the risk of breaking the battery vessels or of causing an agglomeration of the mass. The fragments of the special material employed absorb about three-fourths of their weight of the exciting liquid, while there are still left between them sufficient interstices for receiving and retaining a certain quantity of liquid.

I claim:

1. A packing for preventing movement of the liquid or electrolyte and of the plates in electric primary and secondary batteries consisting in a porcelain or ceramic composition composed of a baked mixture of a double silicate of magnesia and lime and a tri-silicate of magnesia, the said composition being divided in small fragments.

2. A packing for electric primary and secondary batteries consisting in a porcelain or ceramic material composed of a baked mixture of a double silicate of magnesia and lime and a tri-silicate of magnesia, the said composition being divided in small fragments having the size of about one millimeter so as to prevent movements of the electrolyte and of the plates and to prevent the formation of an agglomerated compact mass.

The foregoing specification of my improvements in electric batteries and accumulators signed by me this thirty first day of July, 1913.

FLORENT SABLON.

Witnesses:
LEFE CERL,
ALFRED C. HARRISON.

Copies of this patent may be obtained for five cents each, by addressing the "Commissioner of Patents, Washington, D. C."

---

Correction in Letters Patent No. 1,088,374.

It is hereby certified that the name and residence of the assignee in Letters Patent No. 1,088,374, granted February 24, 1914, upon the application of Florent Sablon, of Faches-Thumesnil, France, for an improvement in "Electric Batteries and Accumulators," was erroneously written and printed as "Société Anonyme Electrique de Chumesnil, of Chumesnil-lez-Lille, France," whereas said name and residence should have been written and printed as *Société Anonyme Electrique de Thumesnil, of Thumesnil-lez-Lille, France;* and that the said Letters Patent should be read with this correction therein that the same may conform to the record of the case in the Patent Office.

Signed and sealed this 20th day of October, A. D., 1914.

[SEAL.]

J. T. NEWTON,

*Acting Commissioner of Patents.* tween them sufficient interstices for receiving and retaining a certain quantity of liquid.

I claim:

1. A packing for preventing movement of the liquid or electrolyte and of the plates in electric primary and secondary batteries consisting in a porcelain or ceramic composition composed of a baked mixture of a double silicate of magnesia and lime and a tri-silicate of magnesia, the said composition being divided in small fragments.

2. A packing for electric primary and secondary batteries consisting in a porcelain or ceramic material composed of a baked mixture of a double silicate of magnesia and lime and a tri-silicate of magnesia, the said composition being divided in small fragments having the size of about one millimeter so as to prevent movements of the electrolyte and of the plates and to prevent the formation of an agglomerated compact mass.

The foregoing specification of my improvements in electric batteries and accumulators signed by me this thirty first day of July, 1913.

FLORENT SABLON.

Witnesses:
LEFE CERL,
ALFRED C. HARRISON.

Copies of this patent may be obtained for five cents each, by addressing the "Commissioner of Patents, Washington, D. C."

---

Correction in Letters Patent No. 1,088,374.

It is hereby certified that the name and residence of the assignee in Letters Patent No. 1,088,374, granted February 24, 1914, upon the application of Florent Sablon, of Faches-Thumesnil, France, for an improvement in "Electric Batteries and Accumulators," was erroneously written and printed as "Société Anonyme Electrique de Chumesnil, of Chumesnil-lez-Lille, France," whereas said name and residence should have been written and printed as *Société Anonyme Electrique de Thumesnil, of Thumesnil-lez-Lille, France;* and that the said Letters Patent should be read with this correction therein that the same may conform to the record of the case in the Patent Office.

Signed and sealed this 20th day of October, A. D., 1914.

[SEAL.]

J. T. NEWTON,
*Acting Commissioner of Patents.*

It is hereby certified that the name and residence of the assignee in Letters Patent No. 1,088,374, granted February 24, 1914, upon the application of Florent Sablon, of Faches-Thumesnil, France, for an improvement in "Electric Batteries and Accumulators," was erroneously written and printed as "Société Anonyme Electrique de Chumesnil, of Chumesnil-lez-Lille, France," whereas said name and residence should have been written and printed as *Société Anonyme Electrique de Thumesnil, of Thumesnil-lez-Lille, France;* and that the said Letters Patent should be read with this correction therein that the same may conform to the record of the case in the Patent Office.

Signed and sealed this 20th day of October, A. D., 1914.

[SEAL.]

J. T. NEWTON,
*Acting Commissioner of Patents.*